UNITED STATES PATENT OFFICE.

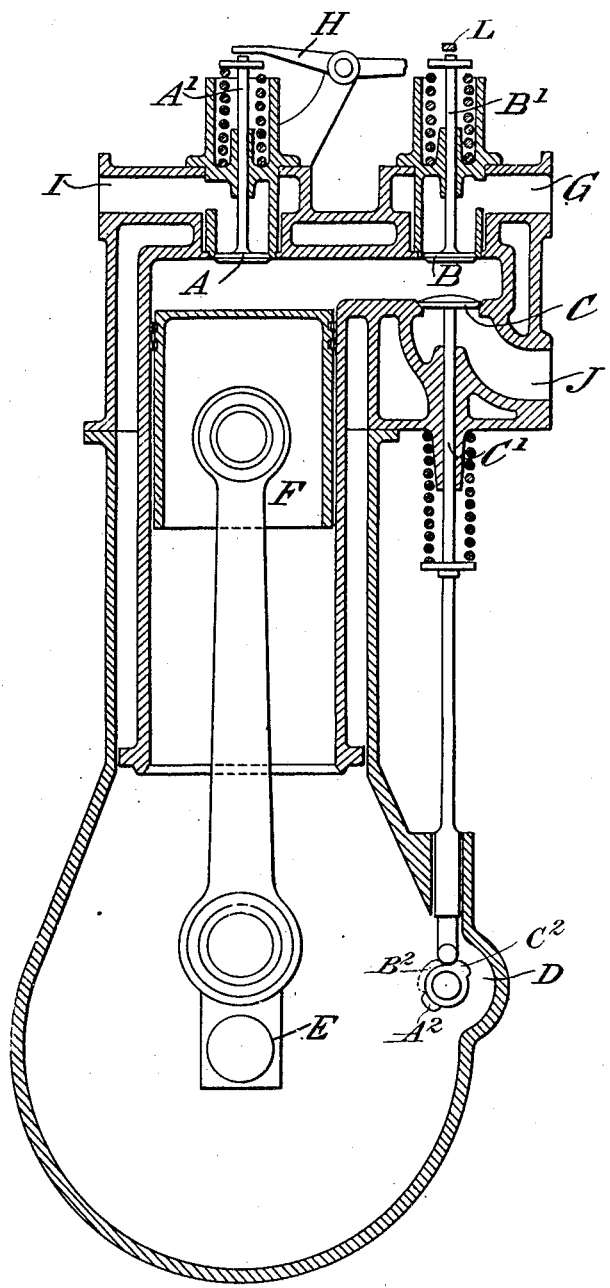

ARTHUR ROLLASON, OF LONG EATON, ENGLAND.

INTERNAL-COMBUSTION ENGINE.

No. 871,602.  Specification of Letters Patent.  Patented Nov. 19, 1907.

Application filed May 2, 1907. Serial No. 371,520.

*To all whom it may concern:*

Be it known that I, ARTHUR ROLLASON, a subject of the King of Great Britain, residing at Long Eaton, in the county of Derby, England, engineer, have invented certain new and useful Improvements in Internal-Combustion Engines, of which the following is a specification.

This invention relates to internal combustion engines using liquid fuel and has for its object to increase the efficiency and economy of such engines, and this it effects by a particular construction hereinafter described in which the scavenging or cooling charge of air left in the clearance space of the cylinder at the end of the scavenging stroke is in part contained in the space immediately in rear of the piston and in part in a space communicating freely therewith but out of line with the cylinder. The former part of the cool air charge is opposed to the entering charge of vaporized fuel or combustible mixture drawn in through the inlet valve in the cylinder end on the suction or charging stroke and serves to break up the entering charge of combustible and promote its diffusion, while the other portion of the cool air charge which, being out of the path of the entering charge, does not mix therewith, or mixes only to a comparatively small extent, during the suction and compression strokes, will upon ignition of the charge absorb heat at the beginning of the explosion, thus reducing the temperature of explosion and the initial pressure in the cylinder and preventing excessive shock to the engine, the heat so absorbed being, however, returned to the working fluid during the expansion stroke.

In the preferred construction the additional scavenging air valve and the exhaust valve are placed in the side chamber of the clearance space and preferably opposite to each other, so that the entering charge of cool air impinges directly on the exhaust valve, and all the valves as well as the cylinder are preferably jacketed.

The arrangement above described has proved itself a simple and effective construction whereby (1) the cylinder may be scavenged by diluting the combustion products left in the clearance space after the previous exhaust stroke and expelling the greater part thereof, (2) overheating of the cylinder, piston and valves, and premature ignition of the charge are prevented, (3) an increased mass of combustible mixture may be taken into the cylinder on the suction stroke, and (4) the shock at explosion diminished and a higher average pressure obtained during the expansion stroke by means of the diluting charge of cool air.

In a six stroke cycle engine the additional scavenging valve is opened during the two strokes made by the engine between the exhaust and suction strokes to admit a full charge of cold air which cools the cylinder, piston head and exhaust valve and when expelled carries with it the combustion products left in the cylinder clearance at the end of the exhaust stroke, leaving the clearance space filled with comparatively cool and pure air.

The cooling of the cylinder and also the presence of the comparatively cool air therein during the suction stroke instead of hot products of combustion not only prevents premature ignition of the charge but also enables a greater mass of combustible mixture to be drawn in during the suction stroke since owing to the low temperature of the cylinder and its contents there will be little if any, expansion of the combustible charge as it is drawn into the cylinder on the suction stroke, and there may even be an absolute reduction in its temperature and corresponding increase in its density, as for example when the liquid fuel used is petroleum and the temperature at which the charge is delivered by the carbureter is greater than that of the cylinder and its contents at the time of introduction of the charge. Further, the presence of the residual air in the clearance space of the cylinder enables a richer combustible mixture to be used than would be possible without imperfect combustion were there no residual air or only waste combustion products in the cylinder at the beginning of the suction stroke.

The accompanying drawing represents a longitudinal section of a six stroke cycle engine constructed according to the present invention portions being broken away so as to avoid confusion.

In this drawing A is the admission valve, B a scavenging valve, C the exhaust valve, D a lay shaft operating the valve spindles A', B', C', by means of cams and making one revolution for every three of the crank shaft E.

Assuming that the piston F in the position shown has just completed an exhaust stroke, the combustion chamber will be filled with hot products of combustion at atmospheric pressure. On the next forward stroke the valve B is opened by means of a lever indicated at L which depresses spindle B', and which is operated by links actuated by a cam B² on shaft D, and said valve is held opened until the end of the return stroke, so that the piston will then have drawn in and discharged through the valve B and port G a quantity of cold air thereby cooling the exhaust valve, piston head, and combustion chamber and leaving the latter filled with air at a comparatively low temperature, and comparatively free from exhaust gases and other residual products of the previous working stroke. At the beginning of the next forward stroke the valve A is opened by a lever H which depresses spindle A' and which is operated by links actuated by a cam A² on shaft D, and said valve is held opened thereby until the completion of the forward stroke, during which a charge of combustible mixture will have been drawn into the cylinder through the valve A and the port I which communicates with a vaporizer. The charge as it is drawn in encounters and mixes with the air in that part of the clearance space immediately behind the piston head.

The charge is compressed on the return stroke, is ignited by suitable means at the end of the stroke, and expanding drives the piston forward, the exhaust gases being expelled through the valve C opened by cam C² operating on spindle C' and port J on the sixth stroke of the engine during which the exhaust valve is held open by the cam shaft.

Since the part of the combustion chamber into which the valves B, C, open is situated to one side of the cylinder and out of the line of the piston and of the incoming charge, the cool air in this space at the beginning of the charging stroke will not be intimately mixed with the charge, but acts as a diluting charge reducing the initial pressure of the explosion by the absorption of heat and giving a higher mean pressure during the working stroke by returning the heat so absorbed to the working fluid and also by insuring complete combustion of the combustible.

Having thus described the nature of this invention and the best means I know of carrying the same into practical effect, I claim:—

1. In a six-stroke cycle internal combustion engine having an additional scavenging valve, a combustion chamber or clearance space having part thereof placed towards one side of the cylinder out of line with the piston and inlet valve, substantially as described.

2. In a six-stroke cycle engine such as referred to in the preceding claim, a clearance space placed to one side of the cylinder and having the exhaust valve and an additional scavenging valve oppositely disposed therein, substantially as described.

In testimony whereof I have signed my name to this specification in the presence of two subscribing witnesses.

ARTHUR ROLLASON.

Witnesses:
   JOSEPH WILLARD,
   W. J. SKEETEN.